(12) United States Patent
Wong et al.

(10) Patent No.: US 10,983,280 B2
(45) Date of Patent: Apr. 20, 2021

(54) FIBER SPLICING USING A TWO-PIECE FERRULE TO FORM A MPO CONNECTOR

(71) Applicant: Senko Advanced Components Inc, Marlborough, MA (US)

(72) Inventors: Yim Wong, Kowloon (HK); Man Kit Wong, Kowloon (HK); Guanpeng Hu, Shenzhen (CN)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/596,564

(22) Filed: Oct. 8, 2019

(65) Prior Publication Data

US 2020/0116936 A1  Apr. 16, 2020

Related U.S. Application Data

(60) Provisional application No. 62/744,608, filed on Oct. 11, 2018.

(51) Int. Cl.
*G02B 6/255* (2006.01)
*G02B 6/38* (2006.01)

(52) U.S. Cl.
CPC ......... *G02B 6/2551* (2013.01); *G02B 6/3849* (2013.01); *G02B 6/3897* (2013.01)

(58) Field of Classification Search
None
See application file for complete search history.

(56) References Cited

U.S. PATENT DOCUMENTS

| 6,554,485 | B1 | 4/2003 | Beatty et al. |
| 7,712,971 | B2 | 5/2010 | Lee et al. |
| 8,596,883 | B2 | 12/2013 | Taira et al. |
| 2012/0082418 | A1* | 4/2012 | Takahashi ............ G02B 6/3887 385/78 |
| 2013/0195406 | A1 | 8/2013 | Cooke et al. |
| 2017/0176694 | A1* | 6/2017 | Childers .............. G02B 6/3885 |
| 2018/0024294 | A1 | 1/2018 | Wang et al. |
| 2018/0031774 | A1 | 2/2018 | Van Baelen et al. |
| 2018/0045894 | A1 | 2/2018 | Takahashi et al. |
| 2018/0335577 | A1 | 11/2018 | Wong et al. |

FOREIGN PATENT DOCUMENTS

EP  3379312 A1  9/2018

OTHER PUBLICATIONS

International Search Report and Written Opinion, Application No. PCT/US2019/055990, dated Dec. 18, 2019.
International Search Report and Written Opinion, Application No. PCT/US2019/055984, dated Dec. 20, 2019.

* cited by examiner

*Primary Examiner* — Chad H Smith
(74) *Attorney, Agent, or Firm* — Edward S. Jarmolowicz, Esq.

(57) ABSTRACT

Splicing or connecting optical fibers extending from a first ferrule and a second ferrule is accomplished using heat or epoxy. Two half ferrules of differing dimensions or the same dimensions are secured together using a pair of guide pins. One of the two ferrules is biased by a spring forward and against a second ferrule to form the mechanical transfer ferrule. The mechanical transfer ferrule is secured within an inner housing of a fiber optic connector by a spring push that is secure to a distal end of the inner housing. A slidable outer housing biased forward by an elastic arm that ensures the fiber optic connector with the spliced two half ferrules is secured within an adapter port.

15 Claims, 7 Drawing Sheets

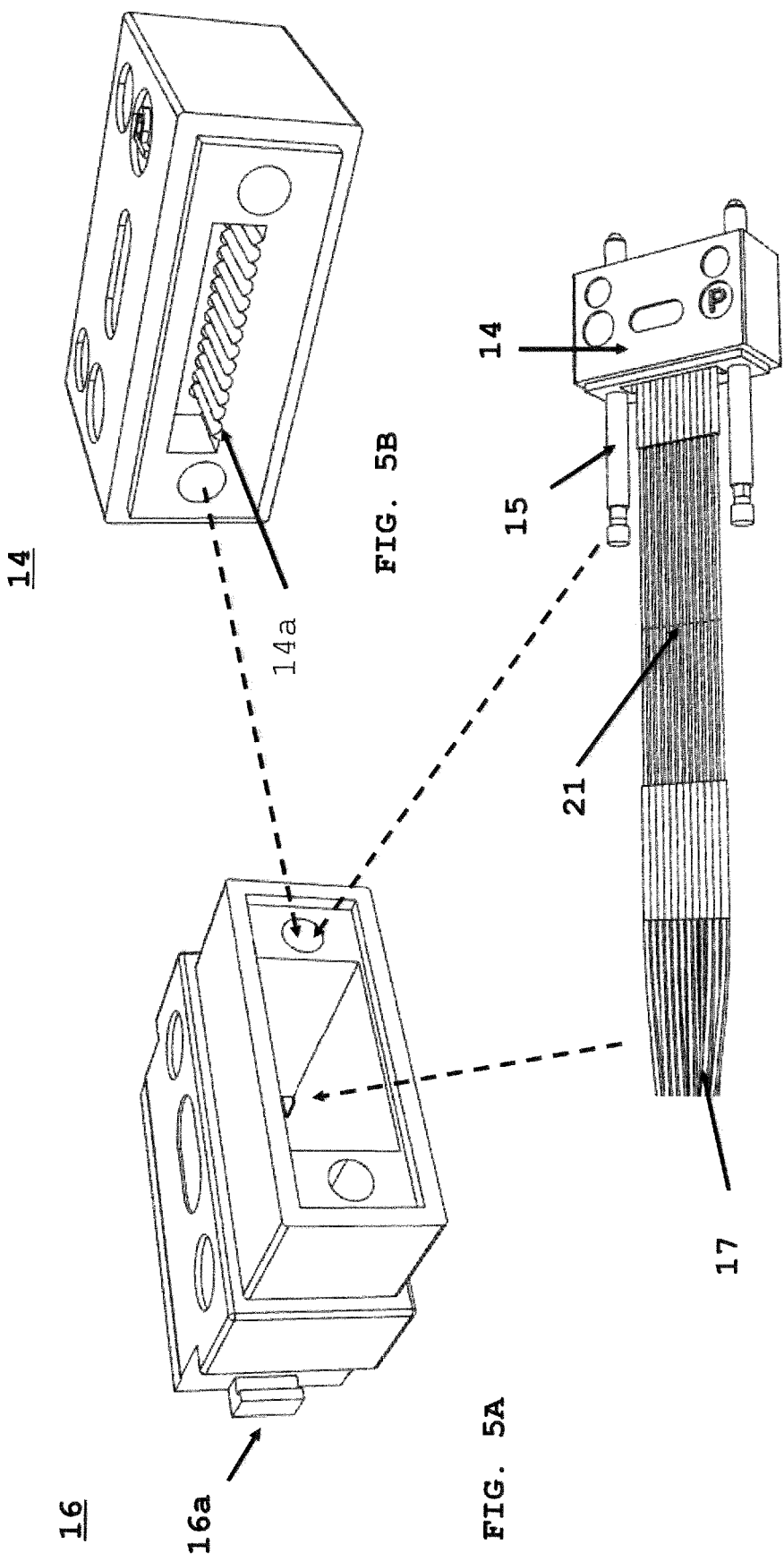

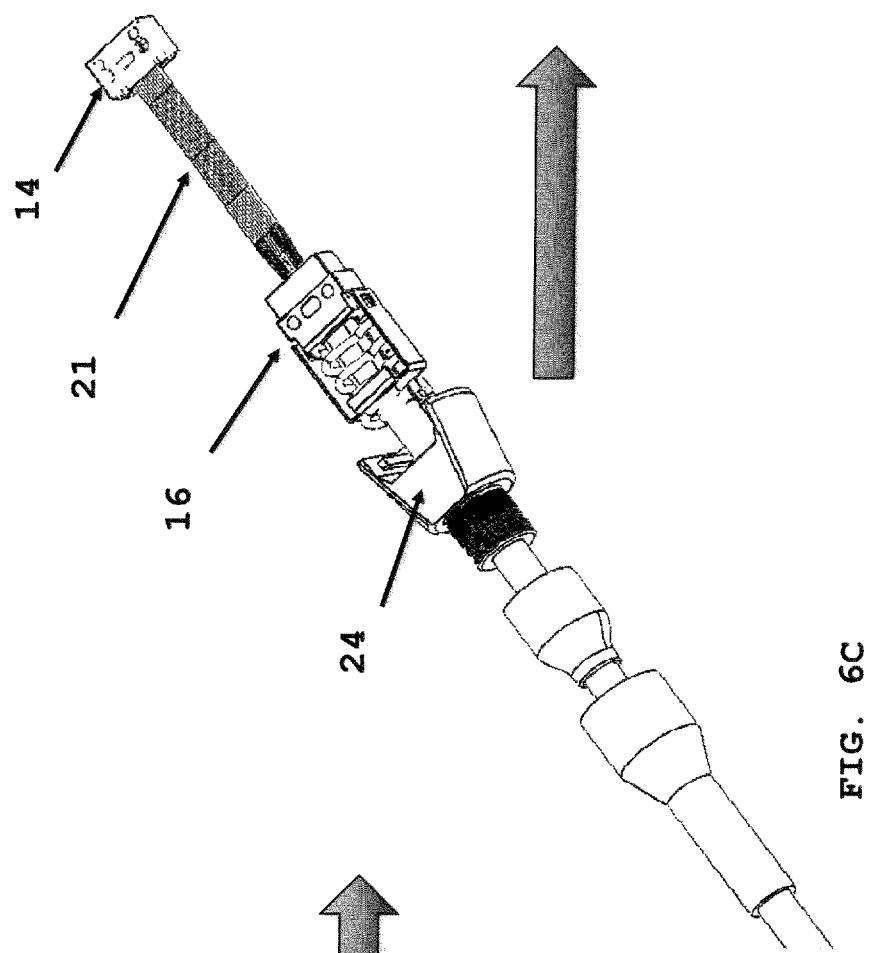
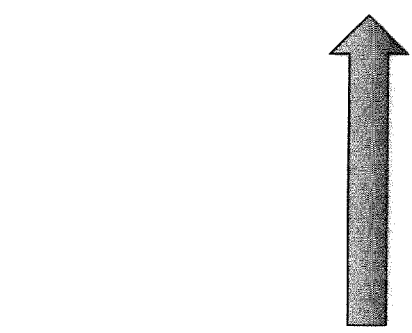
FIG. 6A
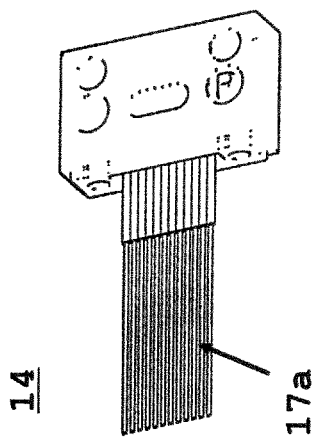
FIG. 6B
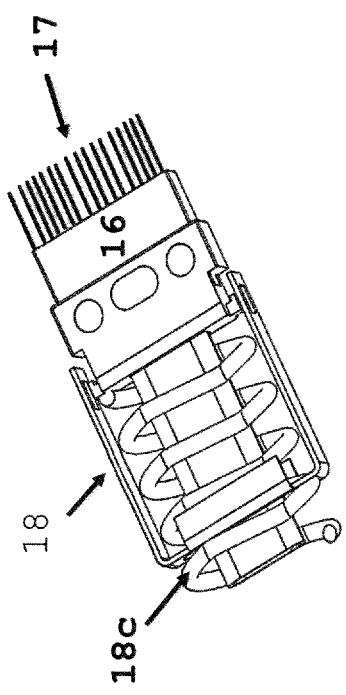
FIG. 6C

FIBER SPLICING USING A TWO-PIECE FERRULE TO FORM A MPO CONNECTOR

RELATED APPLICATIONS

The present invention claims priority to U.S. Provisional Application 62/744,608 filed on Oct. 11, 2018, titled "Splicing of Two Half Ferrules", which is incorporated into the present application.

FIELD OF THE INVENTION

The described technology generally relates to components for connecting data transmission elements and, more specifically, to connectors, adapters, and connection assemblies formed therefrom that are configured to have a reduced profile and/or a reduced quantity of parts in comparison to conventional connection components while providing a secure connection between data transmission elements, such as cable segments, equipment, and/or devices.

BACKGROUND

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs for data volume and transmission speeds.

Individual optical fibers are extremely small. For example, even with protective coatings, optical fibers may be only about 250 microns in diameter (only about 4 times the diameter of a human hair). As such, hundreds of fibers can be installed in cables that will take up relatively little space. However, terminating these fibers with connectors greatly increases the space required to connect cable segments and communication devices. Although multiple fibers may be arranged within a single connector, the resulting connection component may still increase the space used by the optical fibers by 20 to 50 fold. For example, multi-fiber connectors such as those using multi-fiber push-on/pull-off (MPO) technology may connect 12 or 24 fibers. However, a typical MPO connector may have a length of about 30 millimeters to 50 millimeters and a width of about 10 millimeters to 15 millimeters. Multiplying these dimensions by the hundreds of connections in a typical data center results in a significant amount of space devoted to these cable connections. In order to cost-effectively increase data transmission capacity and speed, data centers must increase the number of fiber optic cables and, therefore, cable connections within existing space. Accordingly, data centers and other communication service providers would benefit from a multi-fiber connector having a reduced profile capable of securely connecting multiple fibers while requiring less space than conventional multi-fiber connectors.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In one aspect, a fiber optic connector is formed using an inner housing, a slidable outer housing, and a spliced two-piece mechanical transfer ferrule assembly. The two piece or two part MT ferrule assembly is made up of a first ferrule with one or more optical fibers embedded or secured within the ferrule and a pair of opposing channels that are configured to accept a guide pin. The guide pin extends through the ferrule body along a longitudinal axis of the first ferrule and protrudes from a distal end of the first ferrule. The pair of opposing guide pins are accepted in a pair of opposing channels in a second ferrule. The second ferrule has an opening or passageway through the body of the second ferrule. The passageway provides a corresponding one or more optical fibers from a fiber optic cable, which can be a ribbon cable, for splicing to the optical fiber extending from the distal end of the first ferrule.

After splicing using an epoxy or heat, the splice point is covered with a protective tubing. The protective tubing may be made of a heat shrinkage material. After the opposing fibers are spliced, a pin keep retaining clip is assembled with a bias spring and this is secured to a distal end of the second ferrule by a pair of arms that form the clip. The first ferrule is secured to the second ferrule by inserting the guide pins protruding at the distal end of the first ferrule into the opposing channels at the proximal end of the second ferrule. The excess optical fiber bundle is pulled distally. A back housing is secured to a distal end of the pin keep retaining clip. A spring pusher is secured to a distal end of the back housing. And the assembly of spring pusher and back housing is inserted into an inner housing of the fiber optic connector. A pair of protrusions on a proximal end of the back housing snap into a pair of opposing recesses at a distal end of the inner housing. The inner housing as an elastic arm that biases an outer housing forward.

During use of a multi-fiber push-on/push-off connector or MPO connector, the outer housing covers a pair of opposing latches on the inside of an adapter port. The latches are biased outward and when the MPO connector is inserted into the port, the outer housing is pushed back compressing the elastic arm. The adapter latches are received in opposing recesses forward on opposing sides of the inner housing. When the MPO connector is fully inserted into the port, the outer housing is released and biased forward by the elastic arm covering the adapter latches and preventing the MPO connector from being dislodged from the adapter port.

BRIEF DESCRIPTION OF THE DRAWINGS

The above and other objects of the present invention will become more readily apparent from the following detailed description taken in connection with the accompanying drawings.

FIGS. 5A-5C depict FIG. 4 components according to the two-piece spliced ferrule embodiment.

FIGS. 6A-6F depicts the assembly of the two-piece ferrule assembly.

DETAILED DESCRIPTION

The described technology generally relates to components configured to connect data transmission elements, such as cable segments, communication equipment, networking devices, and computing devices. In some embodiments, the data transmission elements may be connected using reduced-profile connection components, including, without limitation, connectors, ferrules, adapters, and connection assemblies formed therefrom. The spliced two-piece ferrule assembly may be configured to require fewer elements and/or less space than conventional connection components. Each individual ferrule can be sized and shaped to fit an adapter of specific configuration. Also, the MPO fiber optic connector can be assembled in the field without the need for factor termination when splicing can be done using a heat curing epoxy.

Figure 1:
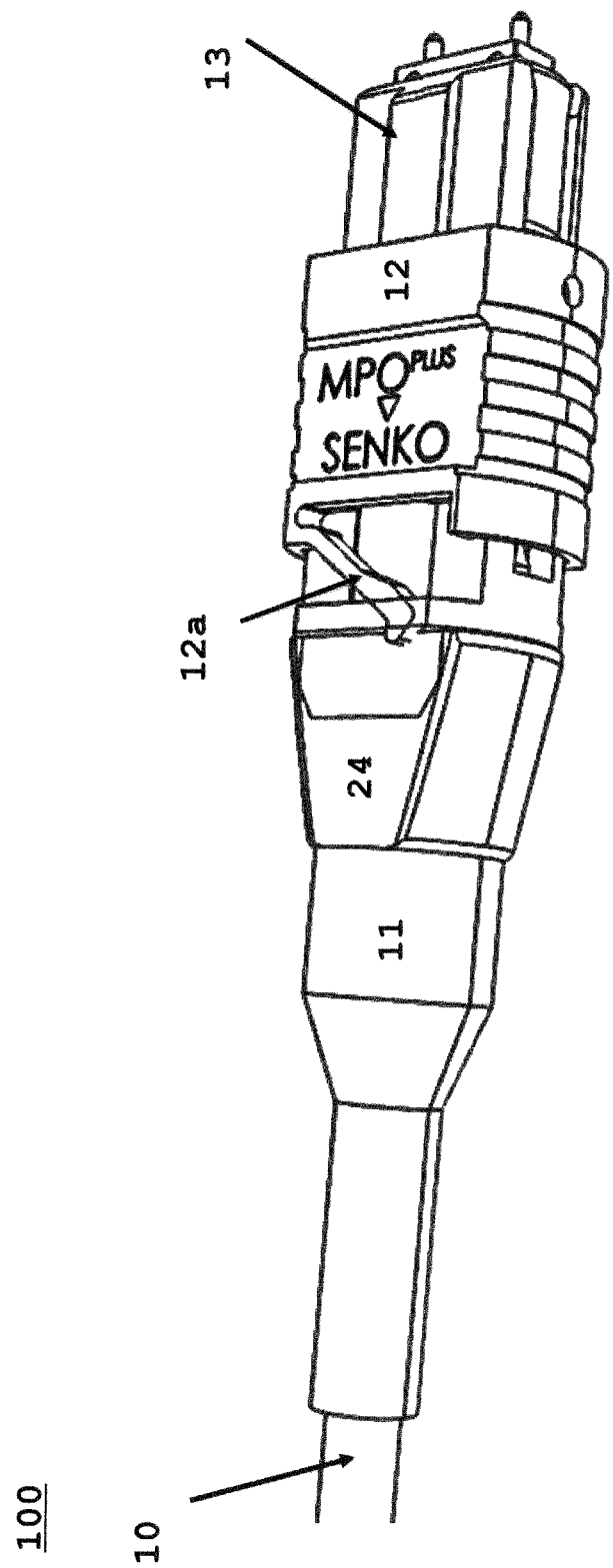
FIG. 1 depicts a prior art multiple-fiber push-on/pull-off (MPO) type multi-fiber connection assembly.

FIG. 1 depicts a prior art MPO connector that does not deploy the inventive splicing of a two-piece ferrule. Fiber optic cable 10 provides at least one optical fiber connected to an optical fiber within the ferrule secured within inner housing 13. Outer housing 12 is movable distally toward the fiber optic cable and proximally over the ferrule. When outer housing 12 is pulled distally elastic arm 12a biases outer housing 12 forward. Cable boot 11 is secured with spring pusher 24 to form MPO connector 100.

Figure 2:
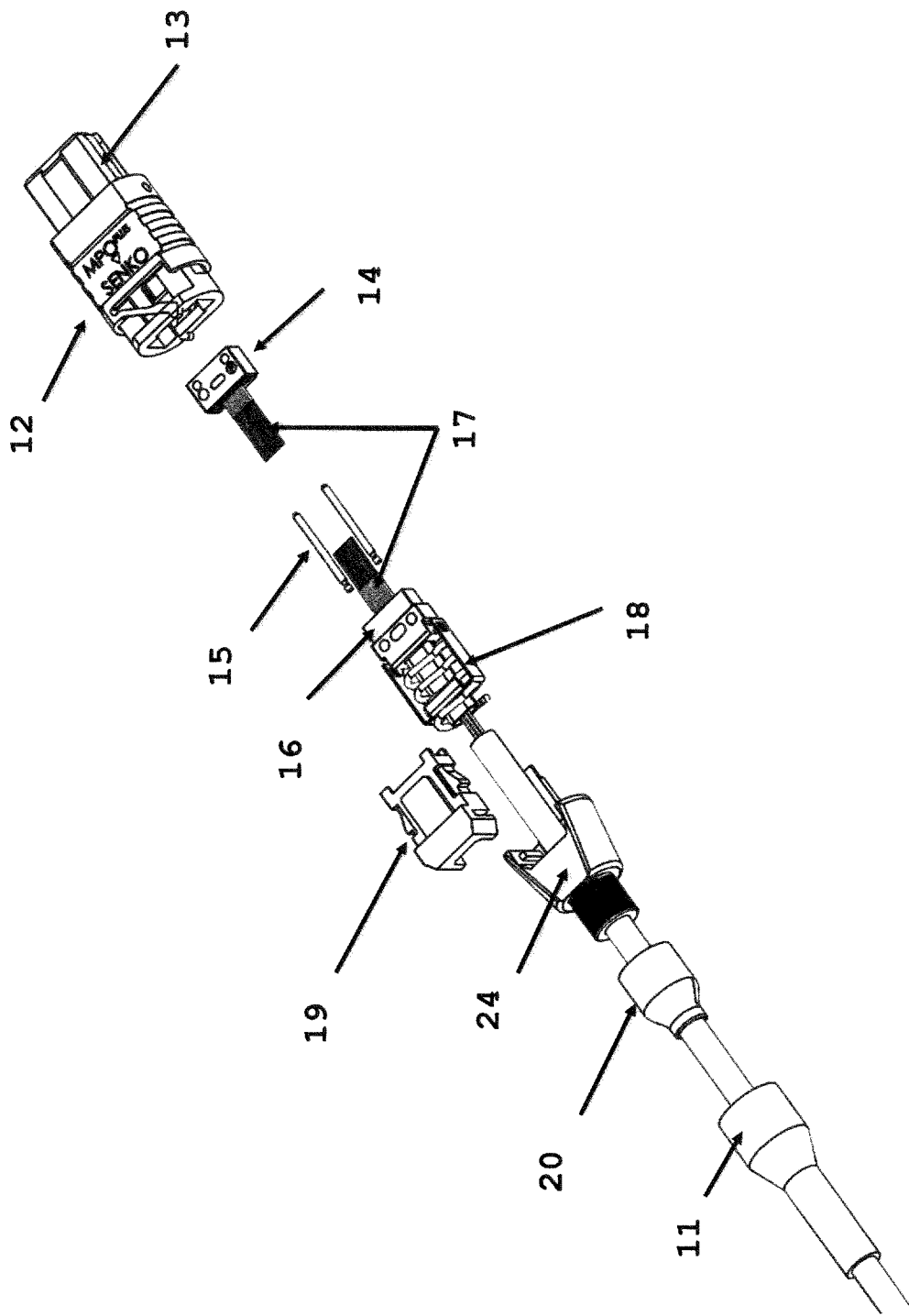
FIG. 2 is an exploded view of the inventive MPO connector assembly.

FIG. 2 depicts an exploded view of MPO connector 100 deploying the two-piece spliced ferrule concept. First ferrule 14 is proximal of second ferrule 16 with at least one optical fiber protruding from a proximal end of second ferrule 16 and at least one optical fiber protruding from a distal end the first ferrule 14. Splice point 21 is formed when connecting the pair of optical fibers protruding from the first ferrule and second ferrule as described above. The splice point is made using an epoxy or heat, or may be a mechanical device. Protective tube 23 (at FIG. 4) covers the splice point. Pair of opposing guide pins 15 interconnect and secure first ferrule 14 to second ferrule 16. Pin keep retaining clip holds bias spring 18d (also at FIG. 4) that is compressed by spring pusher 24 (at FIG. 3). Back housing 19 accepts at a distal end thereof spring pusher 24, and proximal end of back housing 19 is secured to inner housing 13. Crimp ring 20 is screwed onto backpost 24a formed as part of spring pusher 24. Fiber optic cable 10 is secured to a distal end of crimp ring 20 (at FIG. 3). Boot 11 covers crimp ring 20 and optical fiber cable 10 (at FIG. 3).

Figure 3:
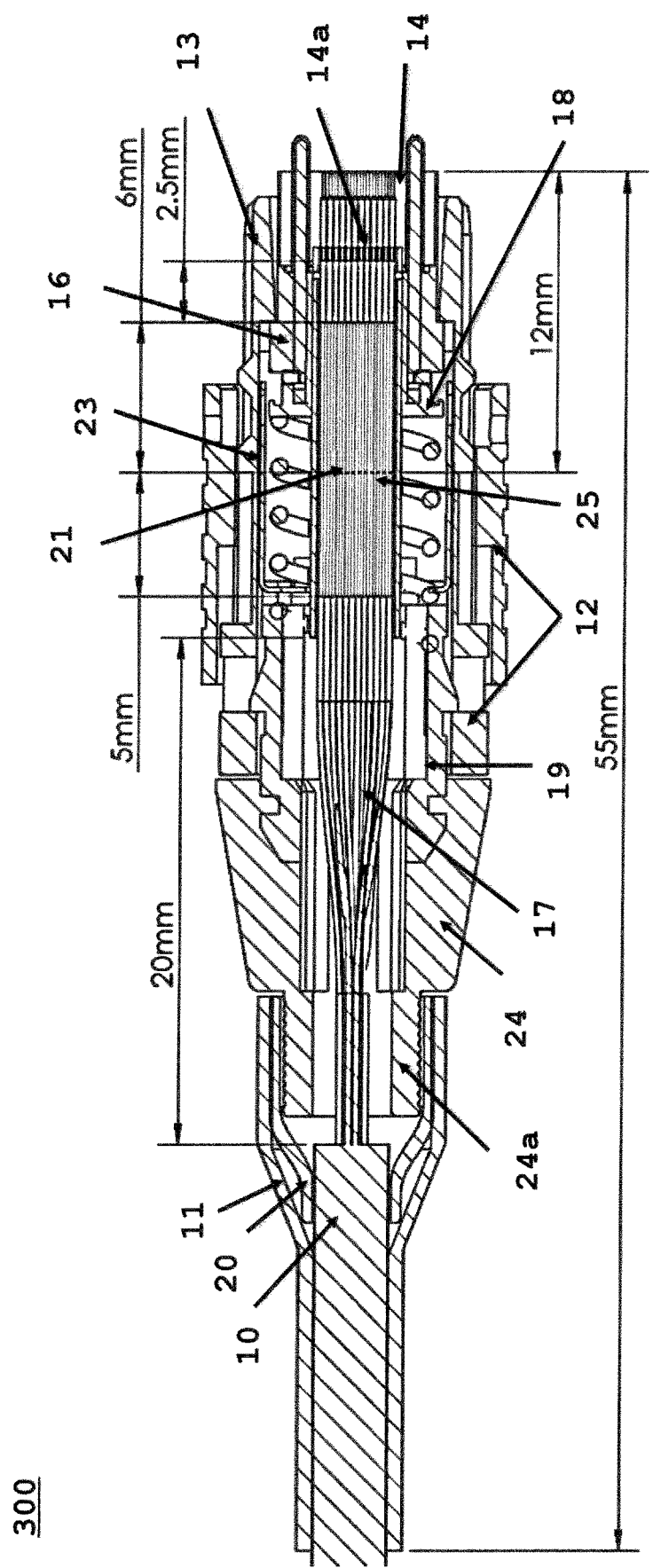
FIG. 3 depicts a cross-sectional view of the MPO connector assembly of FIG. 2.

FIG. 3 depicts a cross-section of MPO connector 100 deploying the inventive two-piece, spliced mechanical transfer ferrule disclosed in this application. Like components in FIG. 2 have the same element number in MPO connector 300 of FIG. 3. FIG. 3 shows MPO connector 300 assembled with splice point 21 covered in epoxy 25 (shown as closer spaced horizontal lines) with protective tube 23 surrounding splice point 21 (shown as dotted vertical line). Connector 300 deploys ribbon cable 17 which can provide up to 24 optical fiber channels. First ferrule 14 and second ferrule 16 formed a mechanical transfer ferrule. First ferrule 14 has a plural of V-grooves 14a formed within the ferrule body for securing an individual optical fiber within first ferrule 14. MPO connector assembled has an overall width of about 55 mm. After mating of the first ferrule and the second ferrule, the width from splice point 21 to first ferrule endface is about 12 mm, with the first ferrule and second ferrule about 6 mm when secured together with guide pins 15 (at FIG. 5C).

Figure 4:
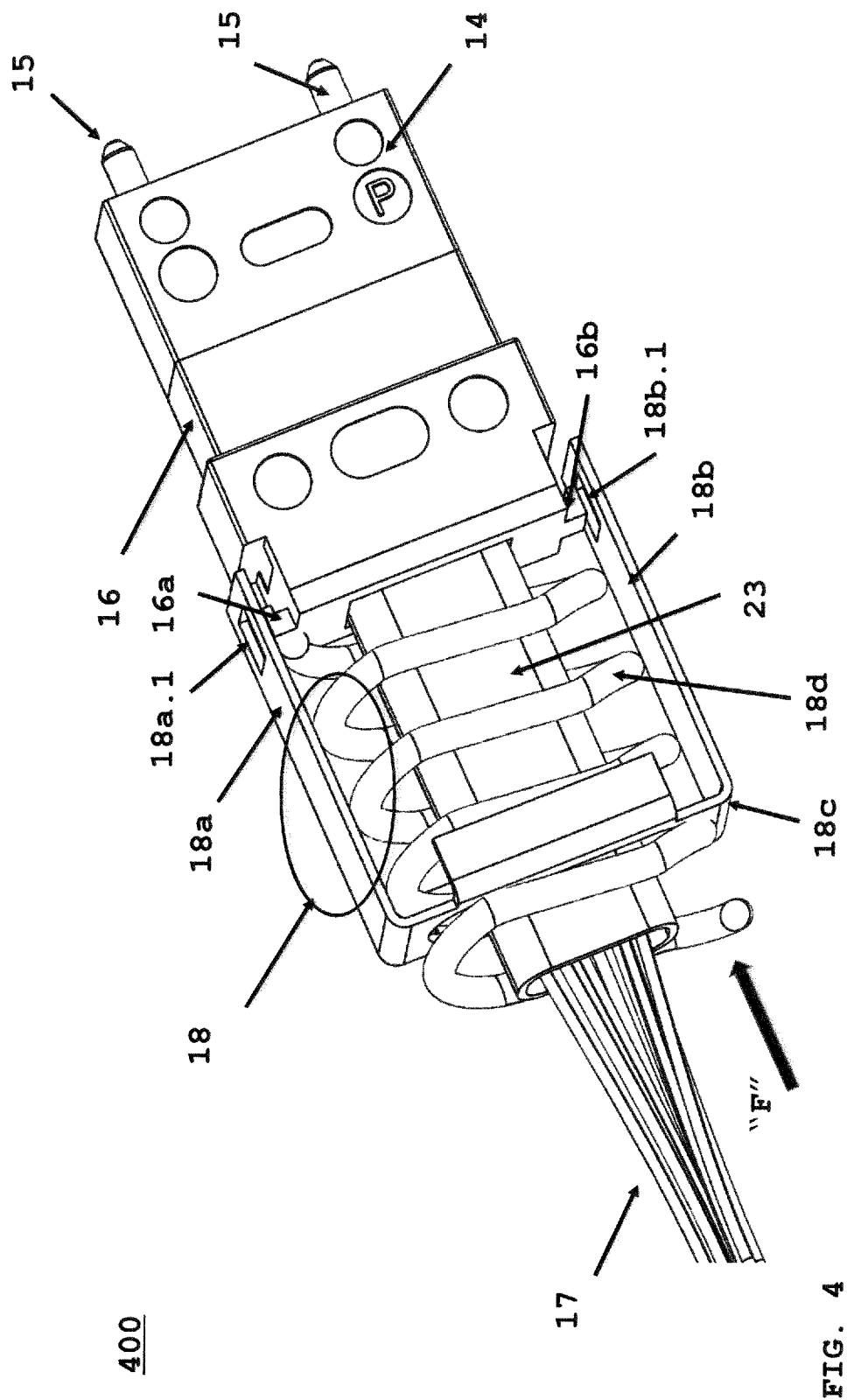
FIG. 4 is an isometric view of the two-piece ferrule with a pin keep retaining clip.

FIG. 4 depicts assembly two-piece spliced ferrule 400 with pin keep retaining clip 18 housing bias spring 18d. First ferrule 14 is secured to second ferrule 16 by opposing guide pins 15. The splice point is covered by protective tube 23 near the mid-point of pin keep retained clip 18. Clip 18 has a pair of opposing arms (18a, 18b) that extend proximally from connecting member 18c. Clip 18 retains spring 18d in a compressed position which is created by spring pusher 24 (at FIG. 6F). Spring pusher 24 creates force "F" in direction of arrow on a distal end of spring 18d. Also, pin keep retaining clip 18 adds to force "F" when the arms are secured within opposing protrusions (16a, 16b) located at a distal end of second ferrule 16 via openings (18a.1, 18b.1) in each arm (18a, 18b).

FIG. 5A depicts second ferrule 16 with the opposing channels to accept guide pint 15 along dotted line when securing first ferrule 14 (at FIG. 5C) to second ferrule 16. Protrusion 16a at a distal end of second ferrule 16 accepts arm 18a formed as part of pin keep retaining clip 18 (at FIG. 4). FIG. 5C depicts splice point 21 location between ribbon cable 17 coming from the network or another MPO connector 100 spliced to a pigtail of optical fiber protruding from first ferrule 14 at a distal end. FIG. 5B depicts an end view of first ferrule 14 showing V-grooves 14a that secures and orients individual optical fibers of the pigtail.

Figure 6E:
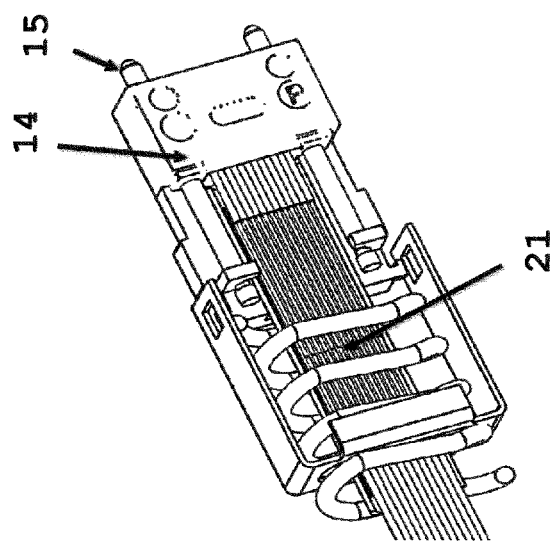
Figure 6D:
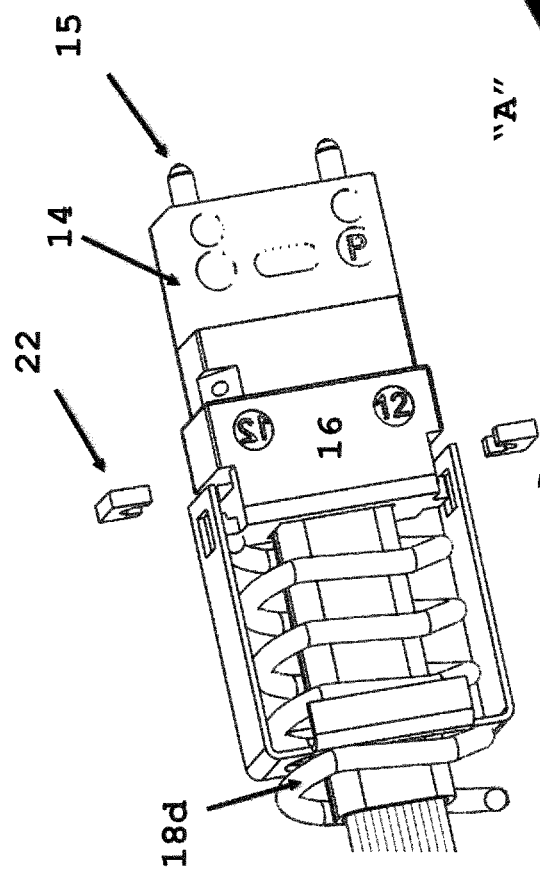
Figure 6F:
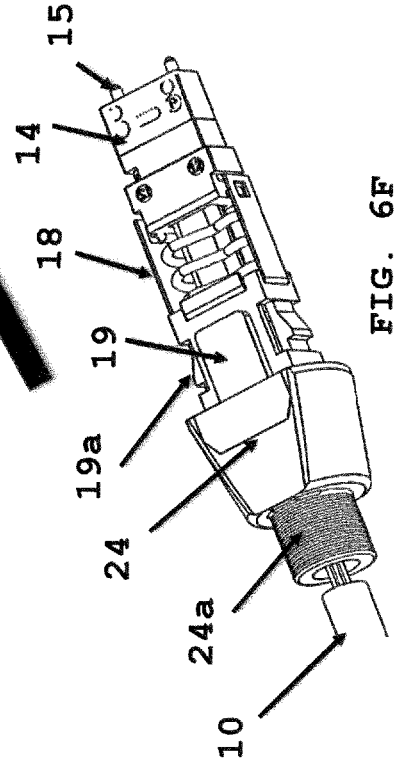

FIGS. 6A-6F depicts assembly of MPO connector 300 formed from MPO connector 100 deploying the inventive concept of two-piece splice ferrule 400. FIG. 6A depicts first ferrule 14 with ribbon cable pigtail 17a. FIG. 6B depicts second ferrule 16 with ribbon cable 17 optical fiber, bias spring 18c within pin keep retaining clip 18. At step 2, FIG. 6C depicts splicing ribbon cable pigtail 17a to ribbon cable 17 at splice point 21. At step 3, FIG. 6D depicts adding retainer clips 22 to further secure pin keep retaining clip 18 secured to the distal end of second ferrule 16 which is secured to first ferrule 14 using guide pins 15. FIG. 6E depicts splice point 21 protected under the spring. At step 4, FIG. 6F depicts securing back housing 19 to the distal end of pin keep retaining clip 18 and a proximal end of spring push 24. Assembling in direction "A" of arrow opposing protrusions 19a are secured in the openings that a distal end of inner housing 13, which forms MPO connector 300 with outer housing 12 having the two-piece spliced ferrule.

Although a fiber optic connector has been used as an illustrative embodiment, this detailed description is not so limited, as any type of electrical and/or communication connector may be used according to some embodiments. The connectors, adapters, and connection assemblies formed therefrom may be used in combination with other connection elements and/or materials, such as crimpers, bands, straps, ferrules, locking materials, fluids, gels, or the like.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to"). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example), the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, or the like. As a non-limiting example, each range discussed herein can be readily broken down into a lower third, a middle third, and an upper third. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed is:

1. A mechanical transfer ferrule formed by splicing, comprising: a first ferrule comprising at least one optical fiber extending from a distal end of the first ferrule and secured within the first ferrule; a second ferrule comprising at least one optical fiber extending from a proximal end of the second ferrule; a pin keep retaining clip; a spring positioned within the pin keep retaining clip, the spring biasing the second ferrule and the first ferrule together; the pin keep retaining clip is secured to a distal end of the second ferrule; and wherein a protective tubing covers spliced optical fibers extending from the first ferrule and the second ferrule to form an optical communication signal path, the pin keep retaining clip having a pair of arms extending from a connecting member proximal, each arm having an opening near an end of each arm, the second ferrule having a pair of opposing protrusions configured to accept the opening of each arm for securing the spring within the pin keep retaining clip.

2. The mechanical transfer ferrule formed by splicing according to claim 1, wherein at least one of the first and second ferrules is a fiber optic ferrule.

3. The mechanical transfer ferrule formed by splicing according to claim 2, wherein the first and second ferrules are configured to form a multi-fiber push-on/push-off fiber optic connector.

4. The mechanical transfer ferrule formed by splicing according to claim 1, wherein a retainer clip secures the pin keep arms to a distal end of the second ferrule.

5. The mechanical transfer ferrule formed by splicing according to claim 1, wherein the first ferrule is attached to the second ferrule by a pair of opposing guide pins.

6. The mechanical transfer ferrule formed by splicing according to claim 1, wherein the optical fibers are spliced using an epoxy, and the splice point is covered with a heat shrinkage protective tubing.

7. The mechanical transfer ferrule formed by splicing according to claim 5, wherein a back housing is secured to a distal end of the pin keep retaining clip.

8. The mechanical transfer ferrule formed by splicing according to claim 7, wherein a spring pusher is snapped onto a distal end of the back housing for biasing the spring forward, the spring pusher further comprises a backpost at a distal end for receiving a fiber optic cable.

9. The mechanical transfer ferrule formed by splicing according to claim 1, wherein there are a plural plurality of spliced optical fibers.

10. The mechanical transfer ferrule formed by splicing according to claim 8, wherein the fiber optic cable is a ribbon cable.

11. The mechanical transfer ferrule formed by splicing according to claim 1, wherein the one of the first or second ferrules is about 6 mm in length.

12. The mechanical transfer ferrule formed by splicing according to claim 11, wherein one of the first or second ferrules with a ribbon cable pigtail is about 12 mm in length.

13. A method of assembling a multi-fiber push-on/push-off fiber optic connector, comprising the steps of: providing the mechanical transfer ferrule having a length of about 6 mm, the mechanical transfer ferrule comprising: a first ferrule comprising at least one optical fiber extending from a distal end of the first ferrule and secured within the first ferrule; a second ferrule comprising at least one optical fiber extending from a proximal end of the second ferrule; a pin keep retaining clip; a spring positioned within the pin keep retaining clip, the spring biasing the second ferrule and the first ferrule together; the pin keep retaining clip is secured to a distal end of the second ferrule; and wherein a protective tubing covers spliced optical fibers extending from the first ferrule and the second ferrule to form an optical communication signal path; securing the first ferrule and the second ferrule together with opposing guide pins; inserting a back housing onto a distal end of the pin keep retaining clip; inserting a spring pusher onto a distal end of the back housing; and snapping a proximal end of the back housing into a distal end of an inner housing.

14. The method of assembling a multi-fiber push-on/push-off fiber optic connector of claim 13, further comprising the step of: securing an outer housing over the inner housing.

15. The method of assembling a multi-fiber push-on/push-off fiber optic connector of claim 13, further comprising the step of: using an epoxy to splice a ribbon cable and ribbon cable pigtail.

* * * * *